United States Patent
Fukasawa

(10) Patent No.: US 12,199,499 B2
(45) Date of Patent: Jan. 14, 2025

(54) CONTROL DEVICE FOR POWER CONVERSION APPARATUS AND RESISTOR FOR POWER CONVERSION APPARATUS

(71) Applicant: TMEIC Corporation, Chuo-ku (JP)

(72) Inventor: Issei Fukasawa, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 154 days.

(21) Appl. No.: 17/756,060

(22) PCT Filed: Nov. 9, 2020

(86) PCT No.: PCT/JP2020/041771
§ 371 (c)(1),
(2) Date: May 16, 2022

(87) PCT Pub. No.: WO2022/097307
PCT Pub. Date: May 12, 2022

(65) Prior Publication Data
US 2022/0399799 A1    Dec. 15, 2022

(51) Int. Cl.
*H02M 1/12* (2006.01)
*H02M 1/00* (2006.01)
*H02M 1/08* (2006.01)

(52) U.S. Cl.
CPC ......... *H02M 1/123* (2021.05); *H02M 1/0006* (2021.05); *H02M 1/083* (2013.01)

(58) Field of Classification Search
CPC ..... H02M 1/0006; H02M 1/083; H02M 1/123
(Continued)

(56) References Cited

U.S. PATENT DOCUMENTS

2016/0190811 A1    6/2016  Pan et al.
2018/0301905 A1 *  10/2018 Dai ................. H02M 7/483
(Continued)

FOREIGN PATENT DOCUMENTS

EP       2626712 A1 *  8/2013  ............. G01R 31/52
WO   WO 2019/016867 A1    1/2019

OTHER PUBLICATIONS

International Search Report mailed on Jan. 19, 2021 in PCT/JP2020/041771, filed on Nov. 19, 2020, 2 pages.
(Continued)

*Primary Examiner* — Yemane Mehari
(74) *Attorney, Agent, or Firm* — Oblon, McClelland, Maier & Neustadt, L.L.P.

(57) ABSTRACT

A control device for a power conversion apparatus and a resistor for a power conversion apparatus that can suppress a cross current between a plurality of power converters. A control device for a power conversion apparatus includes, in a state that AC sides of a plurality of power converters are connected in parallel without DC sides of the plurality of power converters being connected in parallel: a voltage recognition unit configured to recognize a voltage to ground on a DC side of a power converter, being an object to be controlled; and a controller configured to control, based on the voltage to ground on the DC side recognized by the voltage recognition unit, a DC voltage of the power converter, being the object to be controlled, such that the voltage to ground on the DC side of the power converter, being the object to be controlled, is further reduced.

6 Claims, 4 Drawing Sheets

(58) Field of Classification Search
USPC .......................................................... 363/13
See application file for complete search history.

(56) References Cited

U.S. PATENT DOCUMENTS

| | | | | |
|---|---|---|---|---|
| 2019/0348926 | A1* | 11/2019 | Yoscovich | H02J 3/381 |
| 2023/0216429 | A1* | 7/2023 | Okayasu | G01R 31/52 |
| | | | | 363/56.01 |
| 2024/0022173 | A1* | 1/2024 | Jung | H02S 40/30 |

OTHER PUBLICATIONS

Written Opinion mailed on Jan. 19, 2021 in PCT/JP2020/041771, filed on Nov. 19, 2020 (citing reference AA therein), 3 pages.
Office Action issued May 9, 2023, in corresponding Japanese Patent Application No. 2022-521061 (with English Translation), citing document 15 therein, 5 pages.

* cited by examiner

CONTROL DEVICE FOR POWER CONVERSION APPARATUS AND RESISTOR FOR POWER CONVERSION APPARATUS

FIELD

The present disclosure relates to a control device for a power conversion apparatus and a resistor for a power conversion apparatus.

BACKGROUND

Patent Literature 1 discloses a power conversion system. In the power system, the difference in DC voltage is suppressed between a plurality of power converters. Therefore, a cross current between the plurality of power converters can be suppressed.

CITATION LIST

Patent Literature

[PTL 1] US Patent Application Publication No. 2016/190811

SUMMARY

Technical Problem

However, in the power conversion system described in Patent Literature 1, it is necessary to exchange information on DC voltage between a plurality of control devices respectively corresponding to the plurality of power converters, and it is also necessary to recognize the DC voltages of the plurality of power converters with a common control device to output a DC voltage command value to the plurality of power converters. Therefore, the power conversion system becomes complicated.

The present disclosure has been made to solve the above-mentioned problem. An object of the present disclosure is to provide a control device for a power conversion apparatus and a resistor for a power conversion apparatus which can suppress a cross current between a plurality of power converters with a simple configuration.

Solution to Problem

A control device for a power conversion apparatus according to the present disclosure includes, in a state where AC sides of a plurality of power converters are connected in parallel without DC sides of the plurality of power converters being connected in parallel, and positive electrodes or negative electrodes on the DC sides of the plurality of power converters are connected to a common potential point via a plurality of resistors: a voltage recognition unit configured to recognize a voltage to be applied to a resistor, out of the plurality of resistors, which is connected to a power converter, being an object to be controlled; and a control unit configured to control, based on the voltage recognized by the voltage recognition unit, a DC voltage of the power converter, being the object to be controlled, such that a magnitude of the voltage recognized by the voltage recognition unit is further reduced.

A control device for a power conversion apparatus according to the present disclosure includes, in a state where AC sides of a plurality of power converters are connected in parallel without DC sides of the plurality of power converters being connected in parallel, and positive electrodes or negative electrodes on the DC sides of the plurality of power converters are connected to a common potential point via a plurality of resistors: a voltage recognition unit configured to recognize a voltage to be applied to a resistor, out of the plurality of resistors, which is connected to a power converter, being an object to be controlled; and a control unit configured to control, based on the voltage recognized by the voltage recognition unit, an output zero-phase voltage of the power converter, being the object to be controlled, such that a magnitude of the voltage recognized by the voltage recognition unit is further reduced.

A resistor for a power conversion apparatus according to the present disclosure includes: one end which is grounded; and another end which is connected to a DC side of a corresponding power converter in a state where AC sides of a plurality of power converters are connected in parallel without DC sides of the plurality of power converters being connected in parallel.

Advantageous Effects of Invention

According to the present disclosure, it is possible to suppress a cross current between the plurality of power converters with a simple configuration.

DESCRIPTION OF EMBODIMENT

An embodiment will be described with reference to attached drawings. In the respective drawings, identical or corresponding components are given the same reference symbols. The repetitive descriptions of such components will be simplified or omitted when appropriate.

Embodiment 1

Figure 1:
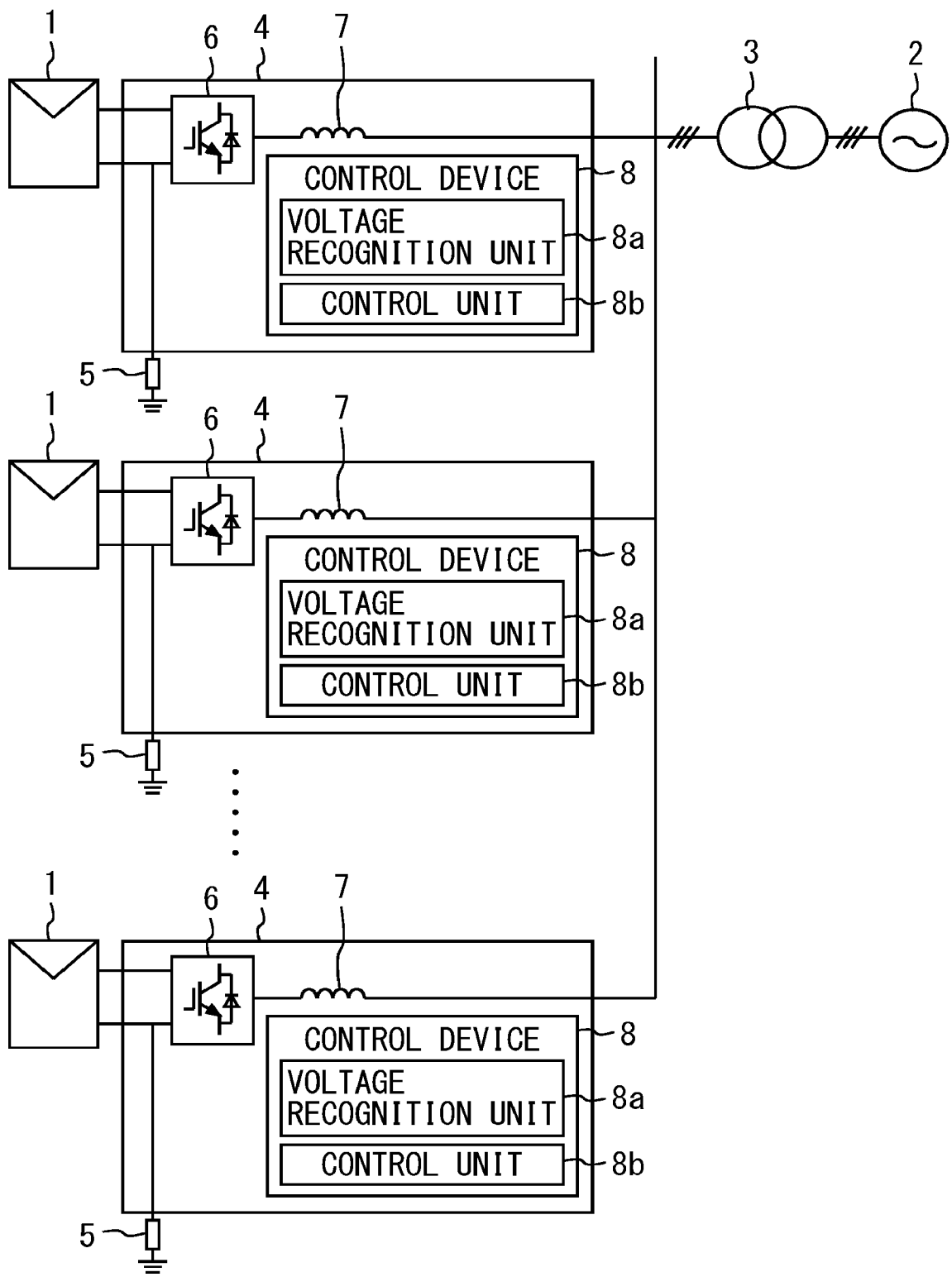
FIG. 1 is a configuration diagram of a power conversion system to which a control device for a power conversion apparatus of an embodiment 1 is applied.

FIG. 1 is a configuration diagram of a power conversion system to which a control device for a power conversion apparatus of an embodiment 1 is applied.

In FIG. 1, each of a plurality of DC power supplies 1 is provided for outputting DC power. For example, each of the plurality of DC power supplies 1 is a photovoltaic power generation device. A grid 2 is operated by a power company or the like. The grid 2 is provided for outputting AC power. An interconnection transformer 3 is connected between the DC power supplies 1 and the grid 2.

A plurality of power conversion apparatuses 4 are provided to correspond respectively to the plurality of DC power supplies 1. Each of the plurality of power conversion apparatuses 4 is connected between the corresponding DC power supply 1 and the interconnection transformer 3. The DC sides of the plurality of power conversion apparatuses 4 are not connected in parallel. The AC sides of the plurality of power conversion apparatuses 4 are connected in parallel.

A plurality of resistors 5 are provided to correspond respectively to the plurality of power conversion apparatuses 4. One end of each of the plurality of resistors 5 is grounded. The other end of each of the plurality of resistors 5 is connected to a negative electrode on the DC side of the corresponding power conversion apparatus 4.

For example, each of the plurality of power conversion apparatuses 4 includes a power converter 6, a reactor 7, and a control device 8.

The power converter 6 is provided for converting DC power from the DC power supply 1 to AC power. For example, the reactor 7 is provided for absorbing harmonics of AC power from the power converter 6. The control device 8 includes a voltage recognition unit 8a and a control unit 8b.

The voltage recognition unit 8a recognizes the voltage to ground on the DC side of the power converter 6, being an object to be controlled. For example, the voltage recognition unit 8a recognizes a voltage between the DC negative electrode of the power converter 6, being the object to be controlled, and the ground based on a detected value from a voltage detection unit not shown in the drawing. The control unit 8b controls the power converter 6, being the object to be controlled, based on the DC voltage recognized by the voltage recognition unit 8a.

For example, based on a voltage to ground on the DC side, which is recognized by the voltage recognition unit 8a, the control unit 8b controls the DC voltage of the power converter 6, being the object to be controlled, such that the voltage to ground on the DC side of the power converter 6, being the object to be controlled, is further reduced. For example, based on a voltage to ground on the DC side, which is recognized by the voltage recognition unit 8a, the control unit 8b controls an output zero-phase voltage of the power converter 6, being the object to be controlled, such that the voltage to ground on the DC side of the power converter 6, being the object to be controlled, is further reduced.

Next, the summary of control of the power converter 6 performed by the control device 8 will be described with reference to FIG. 2.

Figure 2:
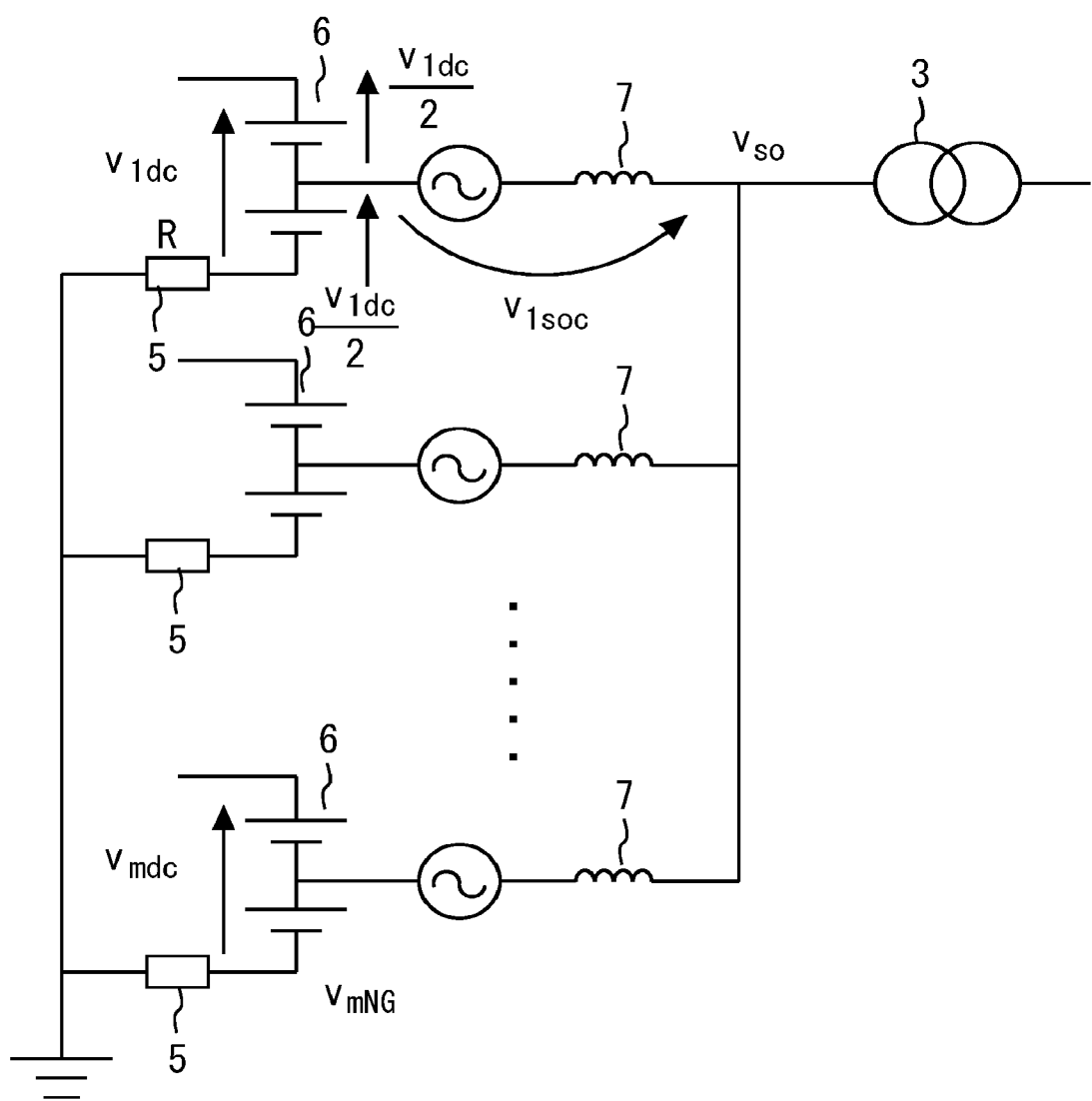
FIG. 2 is a diagram showing an equivalent circuitry focusing on an AC zero-phase component in the power conversion system to which the control device for the power conversion apparatus of the embodiment 1 is applied.

FIG. 2 is a diagram showing an equivalent circuitry focusing on an AC zero-phase component in the power conversion system to which the control device for the power conversion apparatus of the embodiment 1 is applied.

A voltage to ground $v_{iNG}$ of a negative electrode on the DC side of the i-th power converter 6 is shown by the following formula (1).

[Math. 1]

$$v_{iNG} = \frac{m-1}{m}\left(\frac{1}{m-1}\sum_{k \neq i} v_{ksoc} - v_{isoc}\right) + \frac{1}{2}\frac{m-1}{m}\left(\frac{1}{m-1}\sum_{k \neq i} v_{kdc} - v_{idc}\right) (i = 1, 2 \ldots m) \quad (1)$$

In the formula (1), "$v_{idc}$" denotes the DC voltage of the i-th power converter 6, and "$v_{isoc}$" denotes an output zero-phase voltage of the i-th power converter 6 at a parallel connection point with respect to a DC-side virtual neutral point.

Further, the following formula (2) and formula (3) are established.

[Math. 2]

$$\frac{1}{m-1}\sum_{k \neq 1} v_{ksoc} = \frac{1}{m-1}\left(\sum_{k=1} v_{ksoc} - v_{isoc}\right)(i = 1, 2 \ldots m) \quad (2)$$

[Math. 3]

$$\frac{1}{m-1}\sum_{k \neq 1} v_{kdc} = \frac{1}{m-1}\left(\sum_{k=1} v_{kdc} - v_{idc}\right)(i = 1, 2 \ldots m) \quad (3)$$

The formula (2) shows the average value of the output zero-phase voltages of the power converters 6 excluding the i-th power converter 6 at parallel connection points with respect to the DC-side virtual neutral point potential. The formula (3) shows the average value of the DC voltages of the power converters 6 excluding the i-th power converter 6.

Usually, a zero-phase voltage $v_{isoc}$ is smaller than a DC voltage. The difference in zero-phase voltage $v_{isoc}$ is small between the plurality of power converters 6. Therefore, the second term on the right side of the formula (1) dominates for the arbitrary i-th power converter 6.

In the second term on the right side of the formula (1), the following formula (4) is a constant.

[Math. 4]

$$\frac{1}{2}\frac{m-1}{m} \quad (i = 1, 2 \ldots m) \quad (4)$$

In the second term on the right side of the formula (1), the following formula (5) is the average value of the DC voltages of the power converters 6 excluding the i-th power converter 6.

[Math. 5]

$$\frac{1}{m-1}\sum_{k \neq i} v_{kdc} \quad (i = 1, 2 \ldots m) \quad (5)$$

The control device 8 recognizes the voltage to ground $v_{iNG}$ by using the voltage recognition unit 8a. For example, the control device 8 controls the DC voltage $v_{idc}$ of the i-th power converter 6 such that the voltage to ground $v_{iNG}$ of the i-th power converter 6 is further reduced. For example, the control device 8 controls an output zero-phase voltage $v_{isoc}$ of the i-th power converter 6 such that the voltage to ground $v_{iNG}$ of the i-th power converter 6 is further reduced.

Next, control of the power converter 6 performed by the control device 8 will be described in detail with reference to FIG. 3.

Figure 3:
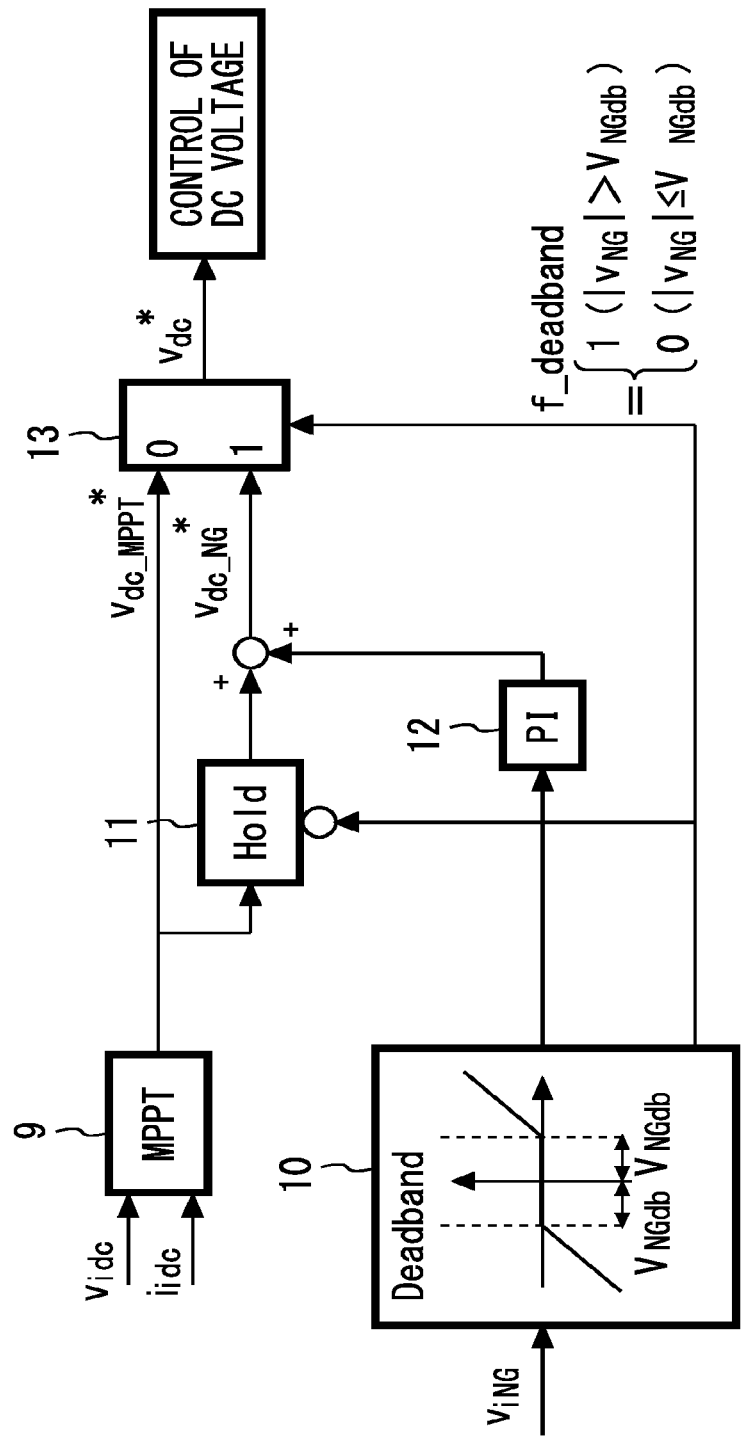
FIG. 3 is a diagram showing control blocks of the control device for the power conversion apparatus of the embodiment 1.

FIG. 3 is a diagram showing control blocks of the control device for the power conversion apparatus of the embodiment 1.

As shown in FIG. 3, the control device 8 includes a first control block 9, a second control block 10, a third control block 11, a fourth control block 12, and a fifth control block 13.

The first control block 9 receives an input of information on the value of the DC voltage $v_{idc}$ of the i-th power converter 6. The first control block 9 receives an input of information on the value of the DC current $i_{idc}$ of the i-th power converter 6. The first control block 9 outputs information on a first temporary voltage command value $v_{dc\_MPPT}{}^*$ which is used when MPPT control is performed, the first temporary voltage command value $v_{dc\_MPPT}{}^*$ being obtained based on the value of the DC voltage $v_{idc}$ and the value of the DC current $i_{idc}$.

The second control block 10 receives an input of information on the value of the voltage to ground $v_{iNG}$ of the i-th power converter 6. The second control block 10 outputs a first output value and a second output value f_deadband which correspond to the value of the voltage to ground $v_{iNG}$. When the absolute value of the voltage to ground $v_{iNG}$ of the i-th power converter 6 is equal to or less than a threshold $v_{NGdb}$ set in advance, the second output value f_deadband is 0. The first output value is also 0. When the absolute value of the voltage to ground $v_{iNG}$ of the i-th power converter 6 is greater than the threshold (dead band) $v_{NGdb}$ set in advance, the second output value f_deadband is 1. The absolute value of the first output value is equal to the difference between the absolute value of the voltage to ground $v_{iNG}$ of the i-th power converter 6 and the threshold (dead band) $v_{NGdb}$ set in advance, and the sign of the first output value is equal to the sign of the voltage to ground $v_{iNG}$ of the i-th power converter 6.

The third control block 11 receives an input of information on the first temporary voltage command value $v_{dc\_MPPT}{}^*$ from the first control block 9. The third control block 11 receives an input of information on the second output value f_deadband from the second control block 10. When the second output value f_deadband is 0, the third control block 11 directly outputs the value of the first temporary voltage command value $v_{dc\_MPPT}{}^*$. The third control block 11 stores the value of the first temporary voltage command value $v_{dc\_MPPT}{}^*$ at the time when the second output value f_deadband from the second control block 10 is changed from 0 to 1, and the third control block 11 outputs the value of the stored first temporary voltage command value $v_{dc\_MPPT}{}^*$ until the second output value f_deadband from the second control block 10 becomes 0 next time.

The fourth control block 12 receives an input of information on the first output value from the second control block 10. The fourth control block 12 outputs a value on which PI control is performed such that the first output value from the second control block 10 approaches 0.

The fifth control block 13 receives an input of information on the first temporary voltage command value $v_{dc\_MPPT}$ from the first control block 9. The fifth control block 13 receives an input of information on a second temporary voltage command value $v_{dc\_NG}{}^*$ which is obtained by summing the output value from the third control block 11 and the output value from the fourth control block 12. The fifth control block 13 receives an input of information on the second output value f_deadband from the second control block 10. When the second output value f_deadband from the second control block 10 is 0, the fifth control block 13 controls the DC voltage of the i-th power converter 6 by using the first temporary voltage command value $v_{dc\_MPPT}$ as a voltage command value $v_{dc}{}^*$. When the second output value f_deadband from the second control block 10 is 1, the fifth control block 13 controls the DC voltage of the i-th power converter 6 by using the second temporary voltage command value $v_{dc\_NG}{}^*$ as a voltage command value $v_{dc}{}^*$.

In this case, the voltage to ground $v_{iNG}$ of the i-th power converter 6 is controlled to be equal to or less than the threshold $v_{NGdb}$ set in advance. As a result, the difference between the i-th power converter 6 and the power converters 6 excluding the i-th power converter 6 is reduced. Specifically, a value shown by the following formula (6) is reduced.

[Math. 6]

$$\frac{1}{m-1}\sum_{k\neq i} v_{kdc} - v_{idc} \quad (i = 1, 2 \ldots m) \qquad (6)$$

According to the embodiment 1 which has been described heretofore, based on the voltage to ground on the DC side of the power converter 6, being the object to be controlled, the control device 8 controls the DC voltage of the power converter 6, being the object to be controlled, such that the voltage to ground on the DC side of the power converter 6, being the object to be controlled, is further reduced. Therefore, it is possible to reduce the difference in DC voltage between the plurality of power converters 6. As a result, it is possible to suppress a cross current between the plurality of power converters 6 flowing through a stray capacity on the DC side. Further, in the case where the DC power supply 1 is a photovoltaic power generation device, a negative electrode is grounded via a resistor, and a negative voltage to ground applied to the negative electrode of a solar cell is suppressed and hence, it is possible to suppress deterioration of the solar cell caused by a PID phenomenon.

In performing control, based on the voltage to ground on the DC side of the power converter 6, being the object to be directly controlled by the control device 8, the control device 8 controls the DC voltage of the power converter 6, being the object to be controlled, such that the voltage to ground on the DC side of the power converter 6, being the object to be controlled, is further reduced. However, it is unnecessary for the control device 8 to recognize values of the voltages to ground on the DC side and the DC voltages of other power converters 6 which are not objects to be directly controlled by the control device 8. Accordingly, it is unnecessary to communicate between the plurality of power conversion apparatuses 4, and to measure the DC voltage of a different power converter 6, for example. Therefore, a cross current between the plurality of power converters 6 can be suppressed with a simple configuration.

For example, the control device 8 controls the DC voltage of the power converter 6, being the object to be controlled, such that the amount of voltage to ground on the DC side of the power converter 6, being the object to be controlled, which exceeds the threshold set in advance is further reduced. Therefore, MPPT control can be performed for each of the plurality of power conversion apparatuses 4 within a range where the magnitude of a voltage to ground does not cause a problem.

Further, based on the DC voltage of the power converter 6, being the object to be controlled, the control device 8 controls the output zero-phase voltage of the power converter 6, being the object to be controlled, such that the voltage to ground on the DC side of the power converter 6, being the object to be controlled, is further reduced. Therefore, it is possible to reduce the difference in DC voltage between the plurality of power converters 6. As a result, it is possible to suppress a cross current between the plurality of power converters 6. At this point of operation, a DC voltage can be freely controlled for achieving the MPPT control performed on each of the plurality of power conversion apparatuses 4.

For example, the control device 8 controls the output zero-phase voltage of the power converter 6, being the object to be controlled, such that the amount of voltage to ground on the DC side of the power converter 6, being the object to be controlled, which exceeds the threshold set in advance is further reduced. Also in this case, it is possible to suppress a cross current between the plurality of power converters 6. At this point of operation, a DC voltage can be freely controlled for achieving the MPPT control performed on each of the plurality of power conversion apparatuses 4.

Further, a voltage to ground on the DC side is further reduced and hence, the maximum voltage of the resistor 5 is reduced. The maximum voltage of the resistor 5 is reduced and hence, power consumption of the resistor 5 is suppressed. Therefore, it is possible to reduce the size of the resistor 5.

In the case where the power converter 6 is not controlled such that a voltage to ground on the DC side is further reduced, it is sufficient to increase the resistance value of the resistor 5. Also in this case, it is possible to suppress a cross current between the plurality of power converters 6 through a grounding conductor with a simple configuration.

It is also possible to adopt a configuration where one end of each of the plurality of resistors 5 is connected to the negative electrode of each of the plurality of power converters 6, the other end of each of the plurality of resistors 5, which is not connected to the negative electrode of each of the power converters 6, is not grounded, but is connected to an arbitrary potential point which is common to all of the plurality of power conversion apparatuses 4, the control device 8 recognizes, by the voltage recognition unit 8a, a voltage to be applied to the resistor in place of the voltage to ground on the DC side of the power converter 6, being the object to be controlled and, based on the voltage recognized by the voltage recognition unit 8a, the control device 8 controls the DC voltage or the output zero-phase voltage of the power converter 6, being the object to be controlled, such that the magnitude of the voltage recognized by the voltage recognition unit 8a is further reduced. Also in this case, the voltage recognized by the voltage recognition unit 8a is equal to the right side of the formula (1) and hence, it is possible to reduce the difference in DC voltage between the plurality of power converters 6 in the same manner. As a result, it is possible to suppress a cross current between the plurality of power converters 6.

With respect to the voltage to ground $v_{iNG}$ of the i-th power converter 6, the formula (1) is derived as described below.

An output zero-phase potential $v_{io}$ of the i-th power converter 6 is defined by the following formula (7).

[Math. 7]

$$v_{io} = \frac{v_{iu} + v_{iv} + v_{iw}}{3} \quad (7)$$

A zero-phase current $i_{io}$ of the i-th power converter 6 is defined by the following formula (8).

[Math. 8]

$$i_{io} = i_{iu} + i_{iv} + i_{iw} \quad (8)$$

A zero-phase potential $v_{so}$ at the parallel connection point is defined by the following formula (9).

[Math. 9]

$$v_{so} = \frac{v_{su} + v_{sv} + v_{sw}}{3} \quad (9)$$

A DC-side virtual neutral point potential $v_{idc}$ is defined by the following formula (10).

[Math. 10]

$$v_{idc} = \frac{v_{iP} + v_{iN}}{2} \quad (10)$$

In the formula (10), "$v_{iP}$" denotes the DC positive electrode potential of the i-th power converter 6, "$v_{iN}$" denotes the DC negative electrode potential of the i-th power converter 6, and "$v_{idc}$" denotes the DC voltage of the i-th power converter 6.

In this case, the zero-phase voltage $v_{isoc}$ of the i-th power converter 6 at the parallel connection point with respect to the DC-side virtual neutral point is shown by the following formula (11).

[Math. 11]

$$v_{isoc} = v_{so} - v_{ic} = v_{so} - \frac{v_{iP} + v_{iN}}{2} = v_{so} - \left(\frac{1}{2}v_{idc} + v_{iN}\right) \quad (11)$$

The following formula (12) can be obtained by transforming the formula (11).

[Math. 12]

$$v_{isoc} + \tfrac{1}{2}v_{idc} + v_{iN} = v_{so} \quad (12)$$

The following formula (13) can be obtained from the formula (12).

[Math. 13]

$$v_{isoc} + \tfrac{1}{2}v_{idc} + v_{iNG} = v_{soG} \quad (13)$$

In the formula (13), "$v_{iNG}$" denotes the voltage to ground of the DC negative electrode of the i-th power converter 6, and "$v_{soG}$" denotes the zero-phase voltage to ground of the i-th power converter 6 at the AC-side parallel connection point.

With respect to the resistor 5, the following formula (14) is established.

[Math. 14]

$$v_{iNG} = R i_{iG} \quad (14)$$

In the formula (14), "R" denotes the resistance value of the resistor 5, and "$i_{iG}$" denotes an electric current flowing through the resistor 5.

The following formula (15) is established according to Kirchhoff's law.

[Math. 15]

$$\sum_{k=1}^{m} i_{kG} = 0 \quad (15)$$

The following formula (16) can be obtained from the formula (14) and the formula (15).

[Math. 16]

$$\sum_{k=1}^{m} v_{kNG} = 0 \quad (16)$$

The following formula (17) can be obtained from the sum of both sides for i=1, 2, . . . , m in the formula (13).

[Math. 17]

$$\frac{1}{m}\sum_{k=1}^{m} v_{ksoc} + \frac{1}{2m}\sum_{k=1}^{m} v_{kdc} + \frac{1}{m}\sum_{k=1}^{m} v_{kNG} = v_{soG} \quad (17)$$

The following formula (18) can be obtained from the formula (16) and the formula (17).

[Math. 18]

$$\frac{1}{m}\sum_{k=1}^{m} v_{ksoc} + \frac{1}{2m}\sum_{k=1}^{m} v_{kdc} = v_{soG} \quad (18)$$

The following formula (19) can be obtained from the formula (13) and the formula (18).

[Math. 19]

$$\frac{1}{m}\sum_{k=1}^{m} v_{ksoc} + \frac{1}{2m}\sum_{k=1}^{m} v_{kdc} = v_{isoc} + \frac{1}{2}v_{idc} + v_{iNG} \quad (19)$$

The following formula (20) can be obtained by transforming the formula (19).

[Math. 20]

$$v_{iNG} = \left(\frac{1}{m}\sum_{k=1}^{m} v_{ksoc} - v_{isoc}\right) + \frac{1}{2}\left(\frac{1}{m}\sum_{k=1}^{m} v_{kdc} - v_{idc}\right) \quad (20)$$

The following formula (21) is defined.

[Math. 21]

$$\sum_{k \neq i}^{m} x_k = \sum_{k=1}^{m} x_k - x_i \quad (21)$$

The following formula (22) can be obtained from the formula (21).

[Math. 22]

$$\frac{1}{m}\sum_{k=1}^{m} x_k - x_i = \frac{m-1}{m}\left(\frac{1}{m-1}\sum_{k \neq i} x_k - x_i\right) \quad (22)$$

The formula (1) is derived from the formula (14) and the formula (22).

Next, an example of the control device 8 will be described with reference to FIG. 4.

Figure 4:
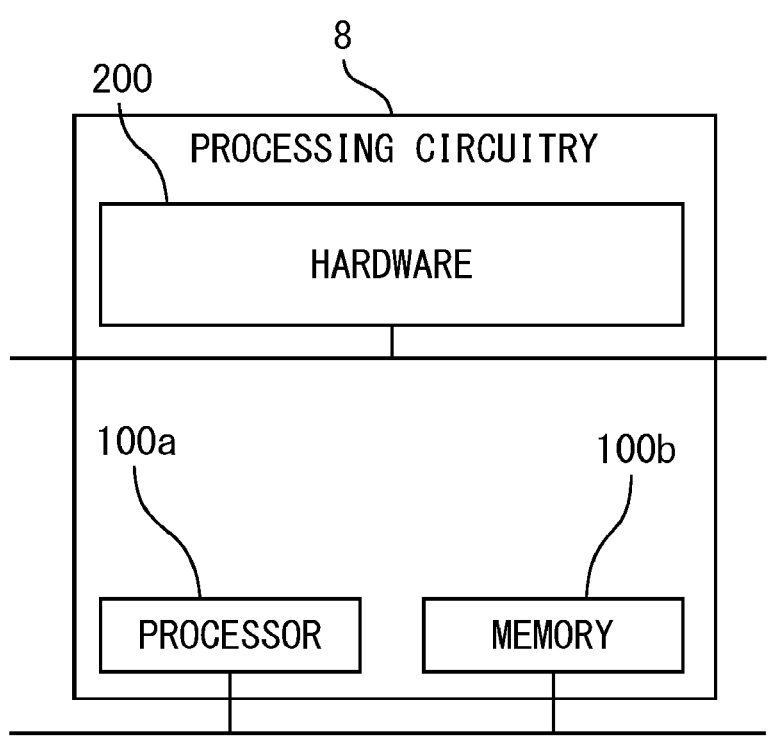
FIG. 4 is a hardware configuration diagram of the control device for the power conversion apparatus of the embodiment 1.

FIG. 4 is a hardware configuration diagram of the control device for the power conversion apparatus of the embodiment 1.

The respective functions of the control device 8 may be achieved by the processing circuitry. For example, the processing circuitry includes at least one processor 100*a* and at least one memory 100*b*. For example, the processing circuitry includes at least one dedicated hardware 200.

In the case where the processing circuitry includes at least one processor 100*a* and at least one memory 100*b*, the respective functions of the control device 8 are achieved by software, firmware, or a combination of the software and the firmware. At least one of the software and the firmware is referred to as a program. At least one of the software and the firmware is stored in at least one memory 100*b*. At least one processor 100*a* reads and executes the program stored in at least one memory 100*b* to achieve the respective functions of the control device 8. At least one processor 100*a* is also referred to as a central processing unit, a processing unit, an arithmetic unit, a microprocessor, a microcomputer, or a DSP. For example, at least one memory 100*b* may be a nonvolatile or volatile semiconductor memory, such as a RAM, a ROM, a flash memory, an EPROM, or an EEPROM, or may be a magnetic disk, a flexible disk, an optical disc, a compact disc, a minidisc, a DVD, or the like.

In the case where the processing circuitry includes at least one dedicated hardware 200, the processing circuitry may be achieved by, for example, a single circuit, a composite circuit, a programmed processor, a parallel programmed processor, an ASIC, an FPGA, or a combination of the above. For example, the respective functions of the control device 8 may be respectively achieved by the processing circuitries. For example, the respective functions of the control device 8 may be collectively achieved by the processing circuitry.

Some of the respective functions of the control device 8 may be achieved by the dedicated hardware 200, and other functions may be achieved by the software or the firmware. For example, the function of the control unit 8*b* may be achieved by a processing circuitry formed of the dedicated hardware 200, and functions other than the function of the control unit 8*b* may be achieved by at least one processor 100*a* reading and executing the program stored in at least one memory 100*b*.

As described above, the processing circuitry achieves the respective functions of the control device 8 by the hardware 200, the software, the firmware, or a combination of the above.

INDUSTRIAL APPLICABILITY

As described above, the power conversion apparatus of the present disclosure may be used for a power conversion system.

REFERENCE SIGNS LIST

1 DC power supply
2 grid
3 interconnection transformer
4 power conversion apparatus
5 resistor
6 power converter
7 reactor
8 control device
8a voltage recognition unit
8b control unit
9 first control block
10 second control block
11 third control block
12 fourth control block
13 fifth control block
100a processor
100b memory
200 hardware

The invention claimed is:

1. A controller for a power convertor belonging to a group of power convertors, each power convertor having a DC side connected to a power supply and an AC side connected to a grid in parallel with other power convertors in the group, the controller comprising:
processing circuitry configured to:
in a state where a positive electrode or a negative electrode on the DC side of each power converter is connected to a common potential point via a resistor, recognize a voltage to be applied to the resistor connected to a target power converter, and
based on the recognized voltage, control a DC voltage of the target power converter to reduce a magnitude of the voltage applied to the resistor connected to the target power converter.

2. The controller for a power convertor according to claim 1, wherein the processing circuitry is further configured to control the DC voltage of the target power converter based on the recognized voltage to reduce a magnitude of an excess of the voltage applied to the resistor connected to the target power converter with respect to a predetermined threshold.

3. A controller for a power convertor belonging to a group of power convertors, each power convertor having a DC side connected to a power supply and an AC side connected to a grid in parallel with other power convertors in the group, the controller comprising:
processing circuitry configured to:
in a state where a positive electrode or a negative electrode on the DC side of each power converter is connected to a common potential point via a resistor, recognize a voltage to be applied to the resistor connected to a target power converter, and
based on the recognized voltage, control an output zero-phase voltage of the target power converter to reduce a magnitude of the voltage applied to the resistor connected to the target power converter.

4. The controller for a power convertor according to claim 1, wherein the processing circuitry is further configured to control the output zero-phase voltage of the target power converter based on the recognized voltage to reduce a magnitude of an excess of the voltage applied to the resistor connected to the target power converter with respect to a predetermined threshold.

5. The controller for a power convertor according to claim 1, wherein the processing circuitry is further configured, in a state where the positive electrode or the negative electrode on the DC side of each power converter is connected to a ground as the common potential point via the resistor, to recognize the voltage to be applied to the resistor connected to the target power converter.

6. The controller for a power convertor according to claim 3, wherein the processing circuitry is further configured, in a state where the positive electrode or the negative electrode on the DC side of each power converter is connected to a ground as the common potential point via the resistor, to recognize the voltage to be applied to the resistor connected to the target power converter.

* * * * *